(12) United States Patent
Liwszyc

(10) Patent No.: US 11,137,668 B2
(45) Date of Patent: Oct. 5, 2021

(54) CAMERA CONTROL METHODS AND APPARATUS

(71) Applicant: JET-CUT OFFSHORE TECHNOLOGY PTY LTD, Clarkson (AU)

(72) Inventor: Adam Liwszyc, Clarkson (AU)

(73) Assignee: JET-CUT OFFSHORE TECHNOLOGY PTY LTD, Clarkson (AU)

( * ) Notice: Subject to any disclaimer, the term of this patent is extended or adjusted under 35 U.S.C. 154(b) by 0 days.

(21) Appl. No.: 16/473,176

(22) PCT Filed: Dec. 19, 2017

(86) PCT No.: PCT/AU2017/051414
§ 371 (c)(1),
(2) Date: Jun. 24, 2019

(87) PCT Pub. No.: WO2018/112521
PCT Pub. Date: Jun. 28, 2018

(65) Prior Publication Data
US 2019/0324353 A1 Oct. 24, 2019

(30) Foreign Application Priority Data
Dec. 20, 2016 (AU) .................. 2016905275

(51) Int. Cl.
| | |
|---|---|
| *G03B 17/56* | (2021.01) |
| *F16B 2/18* | (2006.01) |
| *F16M 13/02* | (2006.01) |
| *H02K 7/00* | (2006.01) |
| *F16M 11/10* | (2006.01) |
| *F16M 11/18* | (2006.01) |
| *F16M 11/20* | (2006.01) |
| *F16M 11/42* | (2006.01) |

(52) U.S. Cl.
CPC .......... *G03B 17/561* (2013.01); *F16B 2/185* (2013.01); *F16M 13/022* (2013.01); *H02K 7/003* (2013.01); *F16M 11/10* (2013.01); *F16M 11/18* (2013.01); *F16M 11/2014* (2013.01); *F16M 11/2085* (2013.01); *F16M 11/425* (2013.01); *F16M 2200/027* (2013.01)

(58) Field of Classification Search
USPC ........................................................ 396/428
See application file for complete search history.

(56) References Cited

U.S. PATENT DOCUMENTS

| | | | |
|---|---|---|---|
| 2008/0210025 A1 | 9/2008 | Goossen et al. | |
| 2008/0225234 A1* | 9/2008 | Bauer ................ | H04N 5/23212 352/140 |
| 2009/0079282 A1 | 3/2009 | Kono | |

OTHER PUBLICATIONS

International Search Report and Written Opinion Form PCT/ISA210 and PCT/ISA/237, International Application PCT/AU2017/051414, pp. 1-12, International Filing Date Dec. 19, 2017, dated search report Mar. 20, 2018.

* cited by examiner

*Primary Examiner* — Rodney E Fuller
(74) *Attorney, Agent, or Firm* — Bond Schoeneck & King, PLLC; George McGuire

(57) ABSTRACT

A multi-purpose component system for photography is described. The system includes motors having connection channels arranged to engage with T-shaped engagement portions located on photographic equipment components. Cam members located along the engagement portions act to fix the motors in position relative to the components.

9 Claims, 4 Drawing Sheets

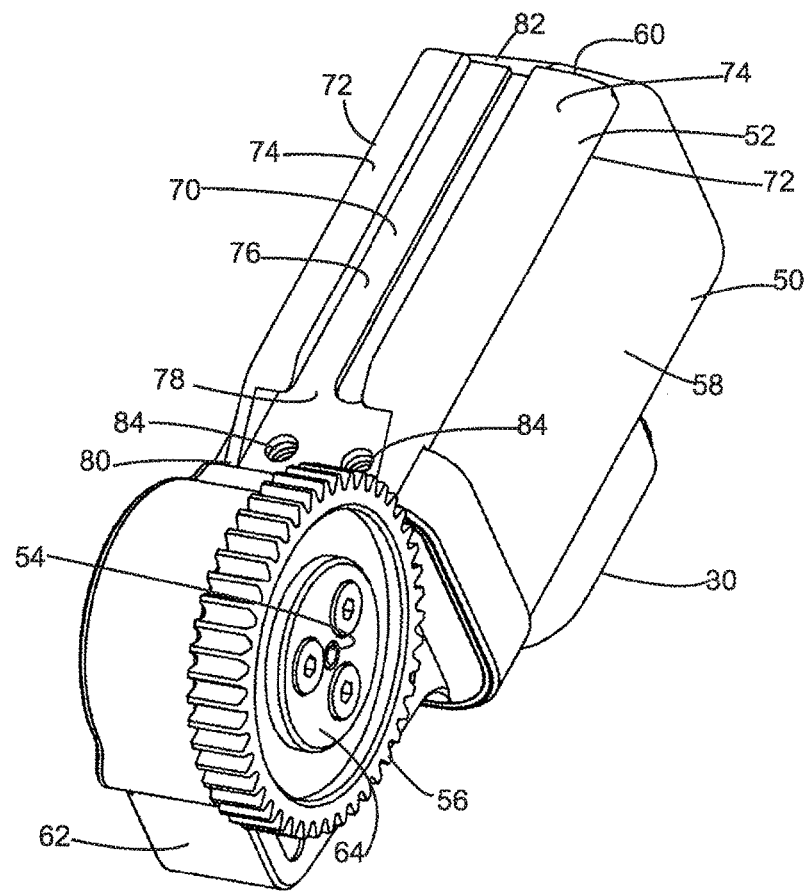
Fig. 2
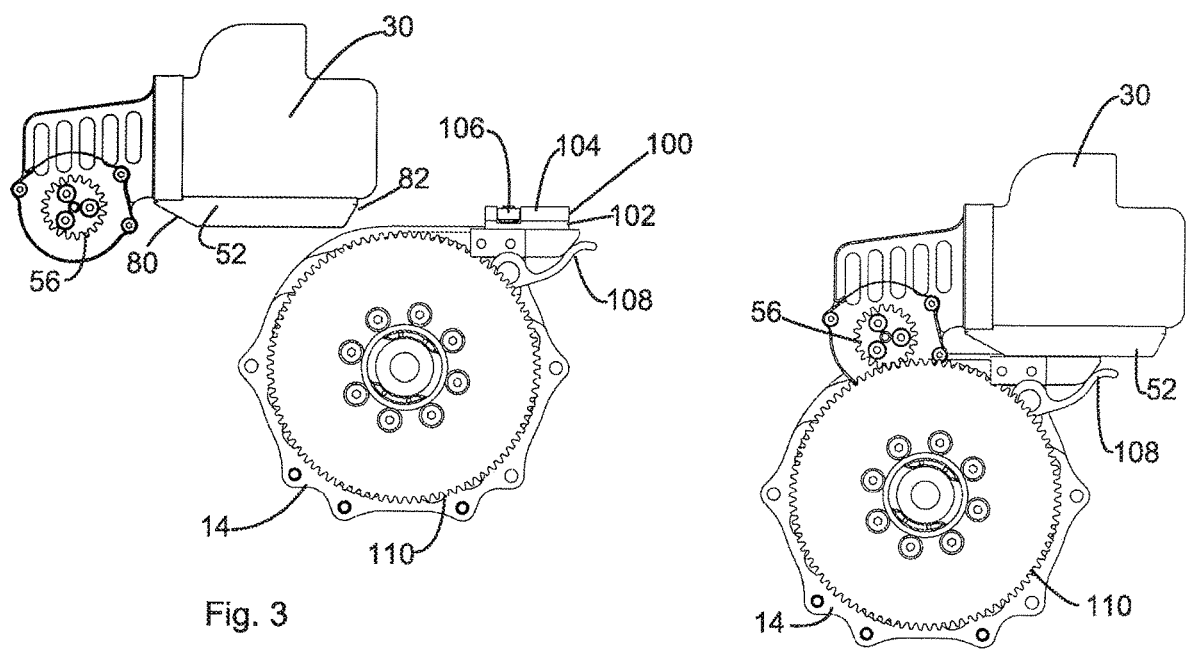
Fig. 3
Fig. 4

CAMERA CONTROL METHODS AND APPARATUS

CROSS REFERENCE TO RELATED APPLICATIONS

The present application is the U.S. National Stage Application of PCT Application No. PCT/AU2017/051414, filed Dec. 19, 2017, which claims priority to Australian Application No. 2016905275, filed Dec. 20, 2016, the entirety of each of which are hereby incorporated by reference.

FIELD OF THE INVENTION

The present invention relates to apparatus and control systems used in filming and photography.

BACKGROUND TO THE INVENTION

Modern photography and film making involves many different techniques, using different apparatus and control methods. These include aspects such as cinema motion control; time lapse photography; stop motion animation; lens control for focus/iris/zoom (FIZ); $2^{nd}$ operator control of gyro-stabiliser systems; camera parameter control (e.g. by USB interface); and design of user-defined camera rigs.

Using traditional equipment each of these techniques requires dedicated, specialised apparatus.

The present invention seeks to provide a versatile system with multi-purpose components, which can be arranged in different configurations in order to perform many if not all of the above discussed techniques by appropriate tasking of the components.

SUMMARY OF THE INVENTION

One key to the present invention is the provision of a versatile motor, able to be employed in different positions to serve different functions.

According to one aspect of the present invention there is provided a motor for photographic equipment, the motor including a housing, a drive shaft, and a coupling member; the drive shaft extending from the housing, a toothed driving wheel being mounted on the drive shaft; the coupling member being generally elongate and arranged to locate along an elongate surface of the housing, the coupling member being arranged to flex along its length. The flexing may be achieved by fixing the coupling member to the housing at a first elongate end of the coupling member, and allowing a second elongate end of the coupling member to move relative to the housing.

The motor may be arranged to drive a component of photographic equipment, being a driven component. It is preferred that the coupling member is complementary in shape to an engagement portion of a driven component.

The coupling member may be a channel oriented in the elongate direction. The channel may be open at either elongate end, and may have a partially open top surface facing away from the housing.

The channel may be arranged to open towards the first elongate end of the coupling. In this way, the rigidity of the coupling member may be reduced close to its connection with the housing.

The motor may be arranged such that the driving wheel can be readily changed in order to provide a different gearing arrangement.

In accordance with a second aspect of the present invention there is provided a coupling system for the connection of a photographic equipment component to a motor, the coupling including a channel fixed to one of the motor and the component, and an engagement portion fixed to the other of the motor and the component, the engagement portion being complementary in shape to the channel, the engagement portion being moveable between a first configuration in which it can be readily moved within the channel and a second configuration in which it is restricted from moving within the channel.

It is preferred that the engagement portion includes a cam portion, moveable between a first position in which the cam portion is generally aligned with the remainder of the engagement portion, and a second position in which the cam portion is misaligned with the remainder of the engagement portion.

In accordance with a third aspect of the present invention there is provided a clamp for a photographic equipment component, the clamp having an engagement portion for connection to a channel, the clamp having an operating arm coupled to a cam member, the operating arm having a first position in which the operating arm maintains the clamp in a closed position and maintains the cam member in general alignment with the engagement portion, thus permitting movement of the clamp relative to the channel; the operating arm having a second position in which the operating arm maintains the clamp in a closed position and maintains the cam member in misalignment with the engagement portion, thus restricting movement of the clamp relative to the channel; the operating arm having a third position in which the operating arm permits opening of the clamp.

Preferably, when in the third position the operating arm maintains the cam member in general alignment with the engagement portion.

The operating arm may be moveable from the first position to the second position by rotation of the arm about a longitudinal axis, for instance by use of a threaded connection. The operating arm may be moveable from the first position to the third position by pivoting of the arm about a transverse axis.

BRIEF DESCRIPTION OF THE DRAWINGS

It will be convenient to further describe the invention with reference to preferred embodiments of the present invention. Other embodiments are possible, and consequently the particularity of the following discussion is not to be understood as superseding the generality of the preceding description of the invention. In the drawings:

FIG. 2 is a perspective of a motor from within the equipment of FIG. 1;

FIG. 3 is a side view of the motor of FIG. 2 coming into engagement with a 'motion pancake';

FIG. 4 is a side view of the motor and motion pancake of FIG. 3 once engaged;

DETAILED DESCRIPTION OF PREFERRED EMBODIMENTS

Figure 1:
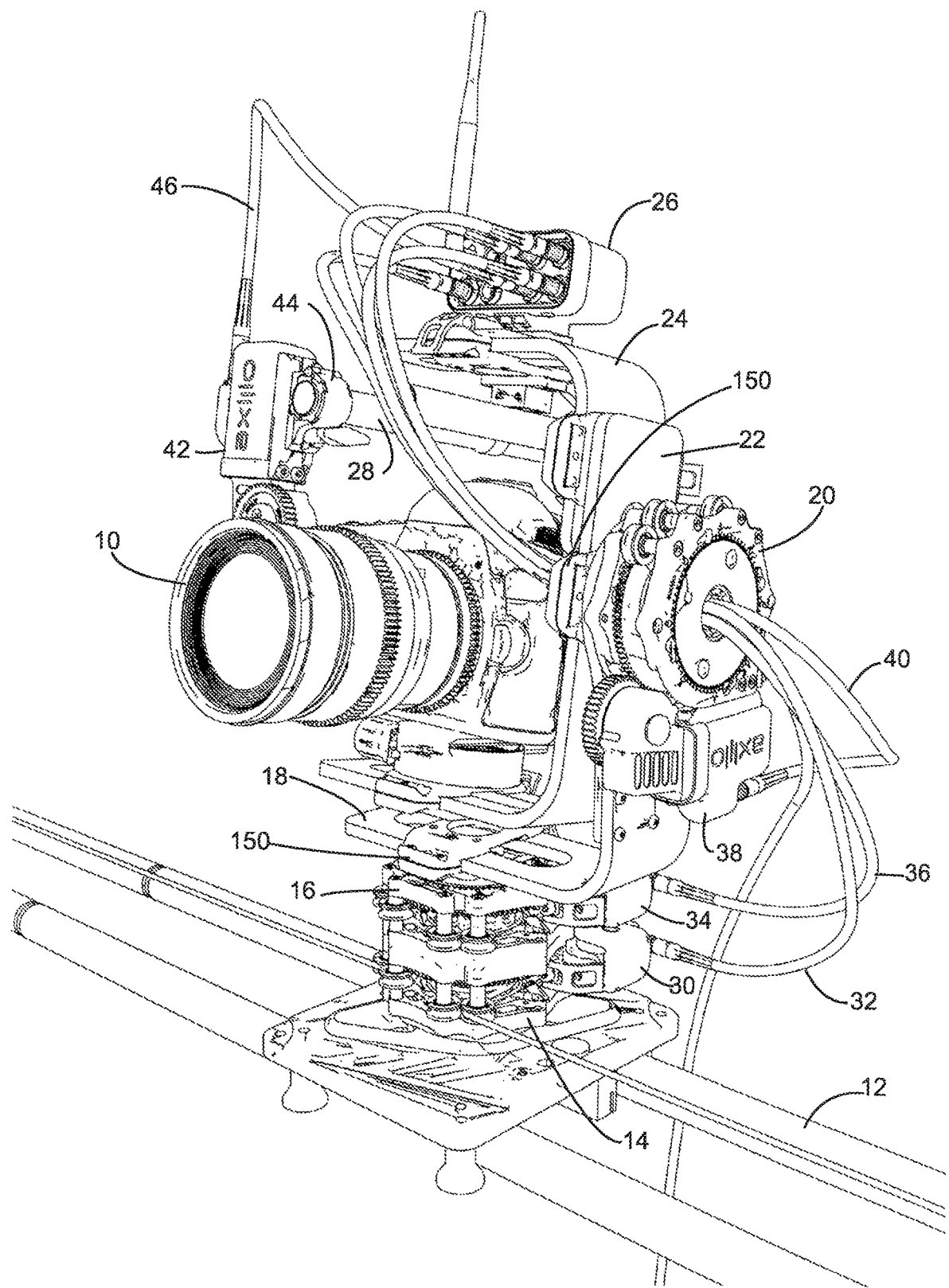
FIG. 1 is a perspective of photographic equipment employing the present invention, including four motors arranged to provide different functions.

Referring to the Figures, FIG. 1 shows photographic equipment arranged to perform various functions. The equipment includes a camera 10; a track 12 on which is mounted a first motion pancake 14 arranged to control lateral movement of the camera 10, a second motion pancake 16 mounted atop the first motion pancake 14 and arranged to control pan of the camera 10 from left to right; an L-shaped first bracket 18 mounted atop the second motion pancake 16; a third motion pancake 20 mounted to the first bracket 18 and arranged to control tilt of the camera 10 up and down; an L-shaped second bracket 22 mounted to the third motion pancake 20 and arranged to support the camera 10; and a superstructure 24 mounted to the second bracket 22 and arranged to support a control unit 26 and a FIZ support arm 28.

A first motor 30 is mounted to the first motion pancake 14 and connected by a first control cable 32 to the control unit 26. A second motor 34 is mounted to the second motion pancake 16 and connected by a second control cable 36 to the control unit 26. A third motor 38 is mounted to the third motion pancake 20 and connected by a third control cable 40 to the control unit 26. A fourth motor 42 is mounted to the FIZ support arm 28 by means of a clamp 44, and is connected by a fourth control cable 46 to the control unit 26.

Each of the first, second, third and fourth motors 30, 34, 38, 42 are similar. The motors will be described with reference to the first motor 30 shown in FIGS. 2 to 4, but it will be understood that the description applies equally to all four motors shown in FIG. 1.

The motor 30 has four primary elements: a housing 50, a coupling member 52, a drive shaft 54 and a toothed driving wheel 56.

The housing 50 includes a body portion 58 which is generally rectangular-prismatic in shape, having an elongate rectangular mounting surface 60 along one side. The housing 50 has an extension portion 62 at one end of the body portion 58, extending away from the body portion 58 at an incline.

The drive shaft 54 extends through the extension portion 62, in a direction transverse to the elongate direction. The arrangement is such that the drive shaft locates along an axis which is close to co-planar with the mounting surface 60.

The drive shaft 54 terminates in a removable gear holding flange 64 on one transverse side of the extension portion 62. The gear holding flange 64 is arranged to clamp the toothed driving wheel 56 in position on the drive shaft 54, such that the toothed driving wheel 56 is arranged to turn with the drive shaft 54. It will be appreciated that the toothed driving wheel 56 can thus be readily exchanged for other driving wheels having different tooth numbers, and thus providing different gear ratios.

The coupling member 52 is elongate, with a base 70, two side walls 72 which extend in the elongate direction and are perpendicular to the base 70, and two top flanges 74 which are parallel to and spaced from the base 70. An elongate gap 76 passes between the two top flanges 74. The coupling member 52 thus forms a T-shaped channel 78.

The coupling member 52 is arranged to locate with its base 70 along the mounting surface 60 of the housing 50. The coupling member has a first end 80 arranged to locate towards the extension portion 62, and a second end 82 arranged to locate away from the extension portion 62.

The side walls 72 are tapered at either end of the coupling member 52. At the first end 80, the side walls 72 are angled relative to the base 70 such that a leading edge of the side walls 72 is angled at about 30° relative to the base 70. At the second end 82, the side walls 72 are angled relative to the base 70 such that a trailing edge of the side walls 72 is angled at about 60° relative to the base 70.

The coupling member 52 is fixed to the mounting surface 60 by two screws 84 located in the base 70 close to the first end 80.

The coupling member 52 is arranged to flex to a degree about the screws 84. It will be appreciated that the tapered nature of the side walls 72 means that the rigidity of the coupling member 52 is reduced near the first end 80. The lack of fixing of the second end 82 of the coupling member 52 to the mounting surface 60 means that the coupling member is able to bend slightly about the screws 84 as will be discussed below.

The motion pancakes 14, 16, 20 and the clamp 44 each have an engagement portion 100 along an edge thereof. The engagement portion 100 is elongate, with a length about half that of the coupling member 52. The engagement portion 100 is generally T-shaped in cross section, with a web 102 extending from a body of the respective motion pancake or clamp, and a flange 104 extending on either side of an outer edge of the web 102.

Figure 5:
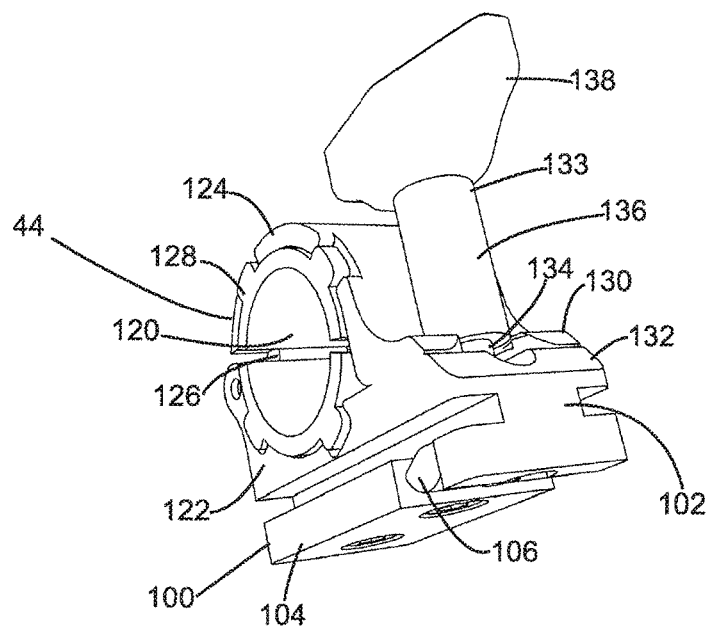
FIG. 5 is a perspective of a clamp from within the equipment of FIG. 1.

A cam portion 106 is located along the flange 104. The cam portion 106 is moveable between a release position as shown in FIG. 5, in which the cam portion 106 is generally within the flange 104, and an engaged position where the cam portion 106 is misaligned with the flange 104.

The arrangement is such that the engagement portion 100 is arranged to locate within the channel 78 formed by the coupling member 52 of the motor 30. When the cam portion 106 is in its release position, the engagement portion 100 can readily move along the channel 78, with the web 102 locating within the gap 76, and the flange 104 sliding between the base 70 and the top flanges 74 of the coupling member 52. When the cam portion 106 is in its engaged position, it forces the flange 104 to bear against the base 70, and the cam portion 106 to bear against the top flanges 74. This provides sufficient friction to fix the engagement portion 100 in a desired longitudinal position along the coupling member 52.

FIGS. 3 and 4 show the connection of the first motor 30 to the first motion pancake 14. The motion pancake 14 has a lever arm 108 connected to its cam portion 106, such that pivoting of the lever arm 108 causes the cam portion 106 to move between a released position as shown in FIG. 3 and an engaged position.

The motion pancake 14 has a toothed driven wheel 110.

The engagement portion 100 of the motion pancake 14 is introduced into the coupling member 52 of the motor 30 at the second end 82 thereof. It is then slid along the coupling member 52 until the toothed driven wheel 110 engages and meshes with the toothed driving wheel 56. The application of a further pushing force to the engagement portion 100 acts to flex the coupling member 52, thus preloading the connection between the driving wheel 56 and the driven wheel 110. Activation of the lever arm 108 to move the cam portion 106 into the engaged position acts to lock the driving wheel 56 and driven wheel 110 in meshed engagement. Operation of the first motor 30 (by means of electrical current passed through the first control cable 32) thus causes rotation of driven wheel 110 of the first motion pancake 14, causing movement of the camera 10 and its associated framework along the track 12.

The second motor 34 is coupled to the second motion pancake 16 in a similar way. Operation of the second motor 34 (by means of electrical current passed through the second control cable 36) causes rotation of a driven wheel of the second motion pancake 16, causing panning of the camera 10 about a vertical axis.

The third motor 38 is coupled to the third motion pancake 20 in a similar way. Operation of the third motor 38 (by means of electrical current passed through the third control cable 40) causes rotation of a driven wheel of the third motion pancake 20, causing tilting of the camera 10 about a horizontal axis.

The second motion pancake 14 and the third motion pancake 20 includes a mechanical rotation limiter (not shown). The rotation limiter provides a mechanical means for preventing over rotation of the respective motion pancake 14, 20. It also provides predetermined limits of rotation which provides a means for calibration of the system.

The fourth motor 42 is held in position against the lens control driven wheels of the camera 10. Operation of the fourth motor 42 (by means of electrical current passed through the fourth control cable 46) causes rotation of the lens controls of the camera 10, allowing FIZ operation.

Figure 6:
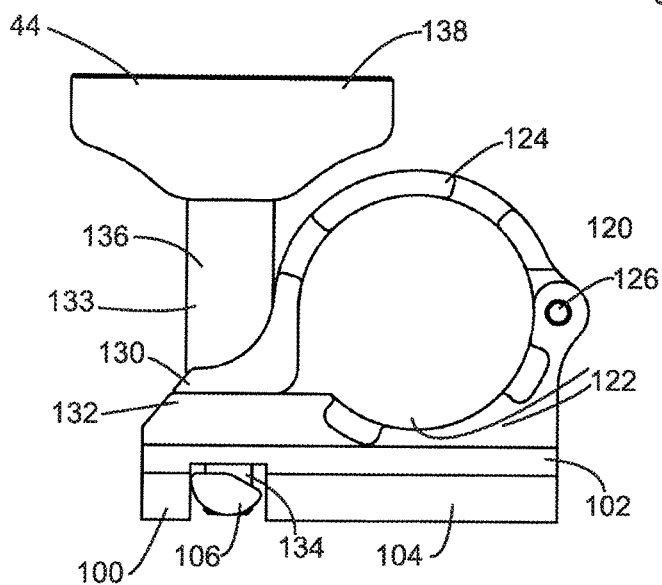
FIG. 6 is a side view of the clamp of FIG. 5 in a first position.
Figure 7:
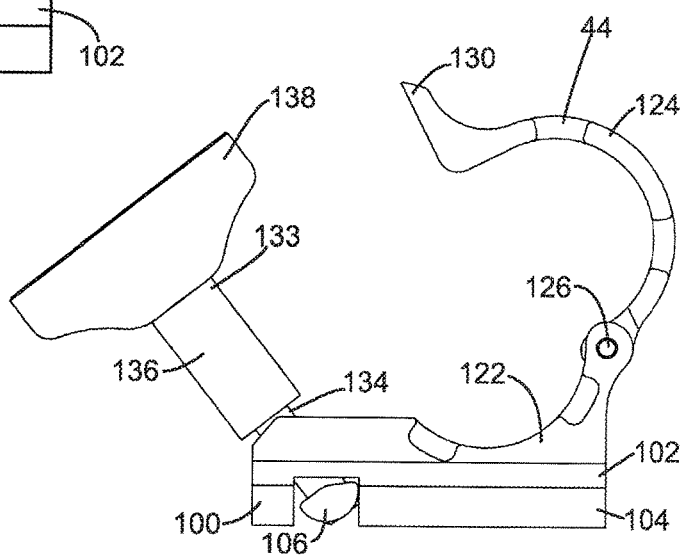
FIG. 7 is a side view of the clamp of FIG. 5 in a third position.

The fourth motor 42 is held in position by means of a clamp 44, as shown in FIGS. 5 to 7. The clamp 44 has a generally cylindrical aperture 120, formed by a fixed lower portion 122 which is connected to a movable upper portion 124 by means of a hinge connection 126. The aperture 120 includes suitably sized inserts 128 which act to define the diameter of the aperture 120.

The upper portion 124 has a U-shaped flange 130 at an outer end, away from the hinge connection 126. The orientation is such that when the clamp is in a closed position the flange 130 sits along an upper mating surface 132 of the lower portion 122.

The clamp 44 has an engagement portion 100 located beneath the lower portion 122, such that the flange 104 is parallel to the upper mating surface 132.

An operating arm 133 is formed from two components: a threaded shaft 134 which is fixed to the cam portion 106, and an internally threaded sleeve 136 which is fixed to a handle 138. The shaft 134 has a diameter sufficiently small to locate within the U-shape of the flange 130. The sleeve 136 has a diameter sufficiently large to be unable to enter the U-shape of the flange 130.

The operating arm 133 can be moved between three positions. In a first position, as shown in FIGS. 5 and 6, the clamp 44 is closed, with the sleeve 136 locating over the flange 130 and holding the clamp in the closed position. The effective length of the operating arm 133 is such that when the sleeve 136 bears against the flange 130 the cam portion 106 is maintained in a release position relative to the engagement portion 100.

Rotation of the sleeve 136 about its longitudinal axis causes shortening of the effective length of the operating arm 133. This action brings the operating arm into a second position, in which the sleeve 136 bears against the flange 130 and the cam portion 106 is maintained in an engaged position. The second position thus both locks the clamp 44 in a closed position, and also locks the engagement portion in a desired position (for instance, relative to the fourth motor 42). This is the state shown in FIG. 1.

From its first position, the operating arm 133 can also be pivoted about the cam portion 106 into a third position, in which the sleeve 136 is located outside the flange 130 as shown in FIG. 7. In this position the upper portion 124 is free to rotate about the hinge connection 126, thus opening the clamp 44.

Figure 8:
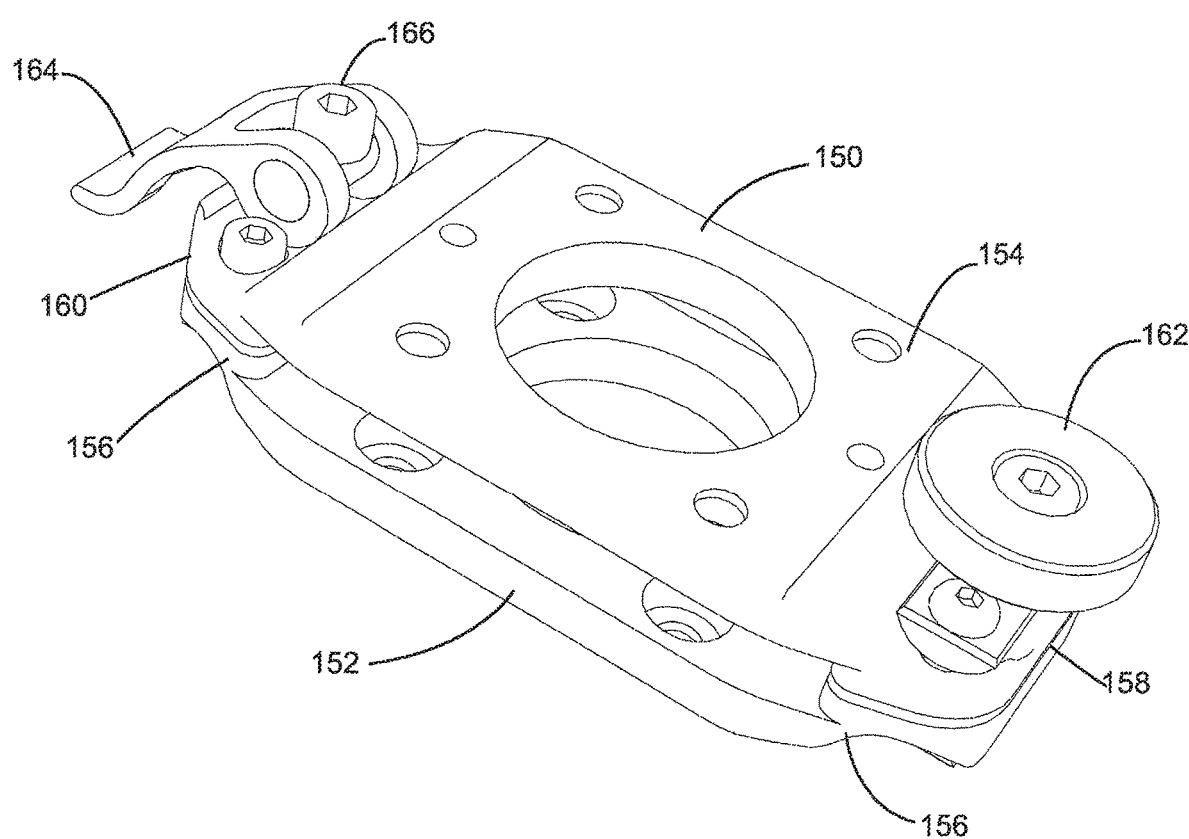
FIG. 8 is a bracket clamp used within the equipment of FIG. 1.

Attachment of the first bracket 18 to the second motion pancake 16 and the second bracket 22 to the third motion pancake 20 is by means of a clamp 150 as seen in FIG. 8.

The clamp 150 has a base portion 152 and an upper portion 154. The base portion 152 is associated with curved bearing members 156, one located at a first end 158 of the clamp 150 and the other located at a second end 160 of the clamp 150.

A thumb screw 162 passes through the upper portion 154 and the base portion 152 at the first end 158, and locates within a threaded apertures in the bearing member 156 of the first end 158. The thumb screw 162 acts to maintain the upper portion 154 and base portion 152 in relation to each other, while permitting limited relative rotation about the bearing member 156. A spring (not shown) is located between the upper portion 153 and the base portion 152 around a shank of the thumb screw 162, allowing for preloading of the clamp 150.

At the second end 160 a lever arm 164 is associated with an adjustment pin 166. The adjustment pin 166 has an outer end receiving within the bearing member 156 of the second end 160. The arrangement is such that the application of a downward force to the lever arm 164 acts to raise the head of the adjustment pin 166, thus locking the upper portion 154 against the base portion 152. The application of an upward force to the lever arm 164 acts to lower the head of the adjustment pin 166, thus allowing a space to form between the upper portion 154 and the base portion 152.

Modifications and variations as would be apparent to a skilled addressee are deemed to be within the scope of the present invention.

What is claimed is:

1. A motor for photographic equipment, the motor including a housing, a drive shaft, and a coupling member; the drive shaft extending from the housing, a toothed driving wheel being mounted on the drive shaft; the coupling member being generally elongate and arranged to locate along an elongate surface of the housing, the coupling member being arranged to flex along its length and, when in a state of flexure, is arranged to preload a connection between the toothed driving wheel and a driven wheel on connected photographic equipment.

2. A motor for photographic equipment as claimed in claim 1, wherein the coupling member is fixed to the housing at a first elongate end of the coupling member, and a second elongate end of the coupling member is allowed to move relative to the housing.

3. A motor for photographic equipment as claimed in claim 2, wherein the channel is open at both elongate ends and wherein the channel has side walls which are tapered towards the first elongate end of the coupling.

4. A motor for photographic equipment as claimed in claim 1, wherein the coupling member has a channel oriented in the elongate direction.

5. A motor for photographic equipment as claimed in claim 4, wherein the channel is open at both elongate ends.

6. A motor for photographic equipment as claimed in claim 4, wherein the channel has a partially open top surface facing away from the housing.

7. A motor for photographic equipment as claimed in claim 1, wherein the motor is arranged to drive a component of photographic equipment, being a driven component, and wherein the coupling member is complementary in shape to an engagement portion of a driven component.

8. A coupling system for the connection of a photographic equipment component to a motor, the coupling including a channel fixed to one of the motor and the component, and an engagement portion fixed to the other of the motor and the component, the engagement portion being complementary in shape to the channel, the engagement portion being moveable between a first configuration in which it can be readily moved within the channel and a second configuration in which it is restricted from moving within the channel, the channel being arranged to flex along its length and, when in a state of flexure, is arranged to preload a connection between the motor and the connected photographic equipment.

9. A coupling system as claimed in claim 8, wherein the engagement portion includes a cam portion, the cam portion being moveable between a first position in which the cam portion is generally aligned with the remainder of the engagement portion, and a second position in which the cam portion is misaligned with the remainder of the engagement portion.

\* \* \* \* \*